United States Patent
Kuehner et al.

(10) Patent No.: US 12,233,899 B2
(45) Date of Patent: Feb. 25, 2025

(54) SYSTEMS AND METHODS FOR SIMULATED RUMBLE STRIPS USING FULLY ACTUATING VEHICLE SEAT

(71) Applicant: Toyota Research Institute, Inc., Los Altos, CA (US)

(72) Inventors: Manuel Ludwig Kuehner, Mountain View, CA (US); Hiroshi Yasuda, San Francisco, CA (US); Jaime S. Camhi, Los Gatos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 245 days.

(21) Appl. No.: 17/706,683

(22) Filed: Mar. 29, 2022

(65) Prior Publication Data

US 2023/0311923 A1  Oct. 5, 2023

(51) Int. Cl.
*B60W 50/16* (2020.01)
*B60N 2/90* (2018.01)
*B60W 40/06* (2012.01)
*B60W 50/14* (2020.01)

(52) U.S. Cl.
CPC .......... *B60W 50/16* (2013.01); *B60N 2/90* (2018.02); *B60W 40/06* (2013.01); *B60N 2002/981* (2018.02); *B60W 2050/143* (2013.01); *B60W 2552/53* (2020.02)

(58) Field of Classification Search
CPC .......... B60W 50/16; B60W 40/06; B60W 2050/143; B60W 2552/53; B60N 2/90; B60N 2002/981
See application file for complete search history.

(56) References Cited

U.S. PATENT DOCUMENTS

| | | | |
|---|---|---|---|
| 5,348,370 A | 9/1994 | Fukuoka | |
| 5,765,116 A * | 6/1998 | Wilson-Jones | G05D 1/0246 340/439 |
| 7,072,764 B2 * | 7/2006 | Donath | G06F 16/29 340/995.18 |
| 7,228,212 B2 | 6/2007 | Hijikata et al. | |
| 7,551,068 B2 | 6/2009 | Powell et al. | |
| 8,405,522 B2 | 3/2013 | Shaffer et al. | |
| 9,123,215 B2 | 9/2015 | Kiefer et al. | |
| 9,349,263 B2 | 5/2016 | Kiefer et al. | |
| 9,517,777 B2 * | 12/2016 | Hall | B60N 2/914 |
| 9,868,332 B2 | 1/2018 | Anderson et al. | |
| 2004/0253053 A1 * | 12/2004 | Wang | E01F 9/529 404/71 |

(Continued)

*Primary Examiner* — Ashley L Redhead, Jr.
(74) *Attorney, Agent, or Firm* — Christopher G. Darrow; Darrow Mustafa PC

(57) ABSTRACT

System, methods, and other embodiments described herein relate to generating a response of a vehicle to a virtual rumble strip. In one embodiment, a method includes determine that a virtual boundary corresponding to a real-world location in proximity of a vehicle has been crossed as the vehicle travels based upon first sensor data generated by the vehicle. The method further includes determine information about an environment of the vehicle as the virtual boundary is crossed based upon second sensor data generated by the vehicle. The method also includes activate an actuator of a seat of the vehicle such that haptic feedback is delivered to the seat, wherein the haptic feedback is based upon the information about the environment and a type of a virtual rumble strip.

17 Claims, 8 Drawing Sheets

(56) References Cited

U.S. PATENT DOCUMENTS

| | | | |
|---|---|---|---|
| 2005/0017861 A1 | 1/2005 | Hunter | |
| 2005/0149251 A1* | 7/2005 | Donath | G01C 21/26 |
| | | | 340/995.14 |
| 2007/0244641 A1 | 10/2007 | Altan et al. | |
| 2016/0129920 A1* | 5/2016 | Hall | B60N 2/665 |
| | | | 701/1 |
| 2017/0313246 A1* | 11/2017 | Chen | B60Q 9/008 |
| 2023/0311923 A1* | 10/2023 | Kuehner | B60N 2/90 |
| | | | 701/94 |

* cited by examiner

SYSTEMS AND METHODS FOR SIMULATED RUMBLE STRIPS USING FULLY ACTUATING VEHICLE SEAT

TECHNICAL FIELD

The subject matter described herein relates, in general, to delivering haptic feedback to a seat of a vehicle, and, more particularly, to generating a response of the vehicle to a virtual rumble strip.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment.

Vehicles may also be equipped with warning systems (such as an advanced driver assistance systems (ADAS)) that analyze sensor data generated by the sensors and that generate warnings based thereon. In an example, a conventional warning system may emit an audible warning and/or visual warning to an operator of a vehicle warning the operator of an object (e.g., a pedestrian, another vehicle, etc.) in an environment of the vehicle. However, conventional warning systems in vehicles tend not to produce warnings that are readily understood by the operator. For instance, a vehicle may generate large amounts of auditory and/or visual stimuli as the vehicle navigates about an environment, some of which may not be related to warnings. For instance, the auditory and/or visual stimuli may include turn signal noises, turn signal indicators, music played through a speaker of the vehicle, blind spot indicators, various dashboard indicators, etc. As such, the operator of the vehicle may find it difficult to distinguish between the auditory and/or visual stimuli and warnings generated by a warning system of the vehicle.

SUMMARY

An example rumble strip simulator system for generating a response of a vehicle to a virtual rumble strip is described herein. In one embodiment, a rumble strip simulator system of a vehicle determines that a virtual boundary has been crossed by at least one of the vehicle or an object (e.g., a pedestrian, a second vehicle, etc.) in proximity of the vehicle based upon first sensor data generated by sensor systems of the vehicle. The virtual boundary corresponds to a real-world location in proximity of the vehicle. In an example, the virtual boundary is a safety envelope determined dynamically by the vehicle. In another example, the virtual boundary encloses a virtual area, where the virtual area corresponds to a real-world area located next to a road marking. In yet another example, the virtual boundary encloses a virtual area, where the virtual area corresponds to a real-world area that encloses a road marking. Upon determining that the virtual boundary has been crossed, the rumble strip simulator system determines information about an environment of the vehicle (e.g., a speed of the vehicle, a heading of the vehicle, classifications of objects in the environment, weather conditions, etc.) based upon second sensor data generated by the sensor systems of the vehicle. The rumble strip simulator system also determines a type of virtual rumble strip (e.g., a centerline rumble strip, a transverse rumble strip, Botts' dots, which is a type of raised pavement markers etc.) based upon the information about the environment of the vehicle or sensor data that was utilized to establish the virtual boundary. The rumble strip simulator system activates an actuator of a seat of an operator of the vehicle such that haptic feedback is delivered to the seat. The haptic feedback is based upon the information about the environment of the vehicle and the type of the virtual rumble strip. In an example, the haptic feedback delivered to the seat mimics vibrations the seat would undergo if one or more tires of the vehicle drove over a real-world rumble strip of the same type as the virtual rumble strip. In this manner, the rumble strip simulator system leverages existing mental impressions (or mental model) and learned behaviors of the operator of the vehicle to produce warnings that are readily understood by the operator.

In one embodiment, a computing system for generating a response of a vehicle to a virtual rumble strip is disclosed. The computing system includes a processor and memory communicably coupled to the processor. The memory stores instructions that, when executed by the processor, cause the processor to determine that the vehicle has crossed a virtual boundary corresponding to a real-world location in proximity to the vehicle based upon first sensor data generated by the vehicle. The instructions further cause the processor to determine information about an environment of the vehicle as the vehicle crosses the virtual boundary based upon second sensor data generated by the vehicle. The instructions further cause the processor to activate an actuator of a seat of an operator of the vehicle such that haptic feedback is delivered to the seat, wherein the haptic feedback is based upon the information about the environment of the vehicle, a speed of the vehicle, an orientation of the vehicle with respect to the virtual boundary, and a type of the virtual rumble strip.

In one embodiment, a non-transitory computer-readable medium for generating a response of a vehicle to a virtual rumble strip and including instructions that, when executed by a processor, cause the processor to perform one or more functions is disclosed. The instructions cause the processor to determine that an object has crossed a virtual boundary corresponding to a real-world location in proximity of the vehicle as the vehicle travels based upon first sensor data generated by the vehicle. The instructions further cause the processor to determine information about an environment of the vehicle as the object crosses the virtual boundary based upon second sensor data generated by the vehicle. The instructions additionally cause the processor to activate an actuator of a seat of the vehicle such that haptic feedback is delivered to the seat, wherein the haptic feedback is based upon the information about the environment of the vehicle and a type of the virtual rumble strip.

In one embodiment, a method is disclosed. The method determine that a virtual boundary corresponding to a real-world location in proximity of a vehicle has been crossed as the vehicle travels based upon first sensor data generated by the vehicle. The method further includes determine information about an environment of the vehicle as the virtual boundary is crossed based upon second sensor data generated by the vehicle. The method further includes activate an actuator of a seat of the vehicle such that haptic feedback is delivered to the seat, wherein the haptic feedback is based upon the information about the environment and a type of a virtual rumble strip.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
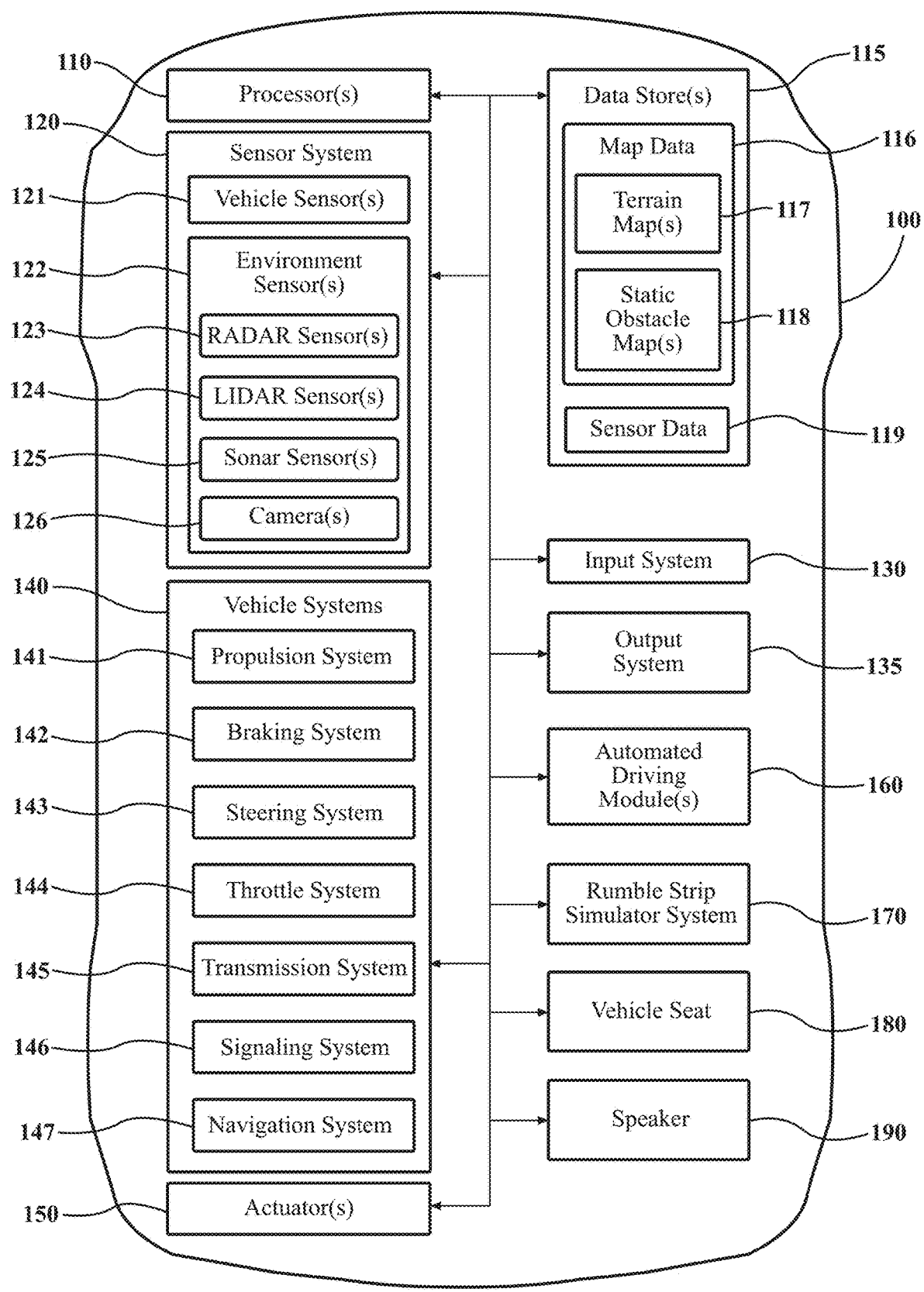
FIG. 1 illustrates one embodiment of a vehicle within which systems and methods disclosed herein may be implemented.

As noted above, a conventional warning system in a vehicle may not to produce warnings that are readily understood by an operator (i.e., a driver) of the vehicle. For instance, a conventional warning system may generate auditory and/or visual warnings that seem unnatural and/or unintuitive to the operator. Furthermore, warnings generated by a conventional warning system may be missed/ignored by the operator due the plethora of visual and/or auditory stimuli generated by the vehicle.

Systems, methods, and other embodiments associated with improving warnings generated by a vehicle are disclosed herein. In one embodiment, sensor systems (e.g., a camera, a speedometer, etc.) of a vehicle generate sensor data as the vehicle moves about an environment. A system of the vehicle determines a virtual boundary based upon the sensor data. The system may also determine the virtual boundary based upon data determined from the sensor data (e.g., classifications of objects represented in the sensor data), data received from an external source (e.g., a map), and/or non-sensor data, where the virtual boundary corresponds to a real-world location in the proximity of the vehicle. The virtual boundary may enclose a virtual area, where the virtual area corresponds to a real-world area in proximity of the vehicle. In one example, the virtual boundary encloses a real-world area that includes a centerline marking on a road. In another example, the virtual boundary encloses a real-world area that is adjacent to the centerline marking. In yet another example, the virtual boundary encloses a real-world area that includes a second vehicle in proximity of the vehicle. In a further example, the virtual boundary is a safety envelope that surrounds the vehicle.

The system determines that the virtual boundary has been crossed based upon first sensor data generated by the sensor systems of the vehicle, that is, the system determines that the real-world location corresponding to the virtual boundary has been crossed. In one example, the system determines that the vehicle itself has crossed the virtual boundary. In another example, the system determines that an object (e.g., a pedestrian, another vehicle, etc.) has crossed the virtual boundary. The system determines information about the environment of the vehicle based upon second sensor data. The system may also determine the information about the environment of the vehicle based upon data derived from the second sensor data, data received from an external source, and/or non-sensor data. In an example, the information about the environment includes a speed of the vehicle, a heading of the vehicle, a classification of a road marking near the vehicle, and a number of tires of the vehicle that have crossed the virtual boundary. The system selects a type of virtual rumble strip based upon the information about the environment and/or the sensor data that was utilized to establish the virtual boundary. The type of virtual rumble strip may include a center lane rumble strip, a shoulder rumble strip, a transverse rumble strip, a raised pavement marker, or Botts' dots.

The system activates an actuator of a seat of an operator of the vehicle such that haptic feedback is delivered to the seat, where the haptic feedback is based upon the information about the environment and the type of virtual rumble strip. For instance, the actuator may cause the seat to vibrate at a frequency and an amplitude that mimics a frequency and an amplitude that the seat would vibrate at if one or more tires of the vehicle were driven over a real-world rumble strip of the same type as the virtual rumble strip. The system may also activate a speaker within the vehicle such that audio feedback is provided within the vehicle, where the audio feedback is also based upon the information about the environment and the type of virtual rumble strip. According to embodiments, the actuator is located between a floor of the vehicle and a frame of the seat and causes an entirety of the frame to vibrate. Thus, the operator experiences haptic feedback and/or the audio feedback as though the vehicle had driven over a real-world rumble strip. In this manner, the operator is warned of conditions existing around the vehicle in an intuitive and natural manner such that the operator may guide the vehicle to a safe area.

The above-described technologies present various advantages over conventional warning systems in vehicles. First, the above-described technologies leverage existing mental models and learned behaviors of an operator of the vehicle. Second, the above-described technologies provide a realistic simulated experience of driving over a rumble strip through, for instance, the use of one or more actuators located between a floor of the vehicle and a frame of a seat of the vehicle. Third, the above-described technologies may provide haptic feedback as a function of time, distance to road elements or an edge of a virtual safety element, speed, driving conditions, and/or driving situation. Fourth, the above-described technologies may provide the haptic feedback to the seat of the operator prior to the vehicle reaching a road marking so that the operator may have ample time to react. Fifth, the above-described technologies may mimic rumble strip vibrations on roads in which physical rumble strips are not present, and hence the above-described technologies may facilitate safe driving on older roads and/or roads that are not well-maintained. Sixth, the above-described technologies may dynamically adjust the haptic feedback based upon vehicle speed, risk levels, road conditions, driving situation, driver alertness, etc. in order to further improve realism of the experience to the operator.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with simulating a rumble strip in order to warn an operator of the vehicle 100 of a scenario that may require the operator to adjust a speed and/or heading of the vehicle 100. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a rumble strip simulator system 170 that is implemented to perform methods and other functions as disclosed herein relating to improving warnings provided to an operator of the vehicle 100 by simulating a response of the vehicle 100 to a rumble strip. The vehicle 100 also includes a vehicle seat 180. The vehicle 100 may also include a speaker 190. As will be discussed in greater detail subsequently, the rumble strip simulator system 170, in various embodiments, is implemented partially within the vehicle 100, and as a cloud-based service. For example, in one approach, functionality associated with at least one module of the rumble strip simulator system 170 is implemented within the vehicle 100 while further functionality is implemented within a cloud-based computing system.

Figure 2:
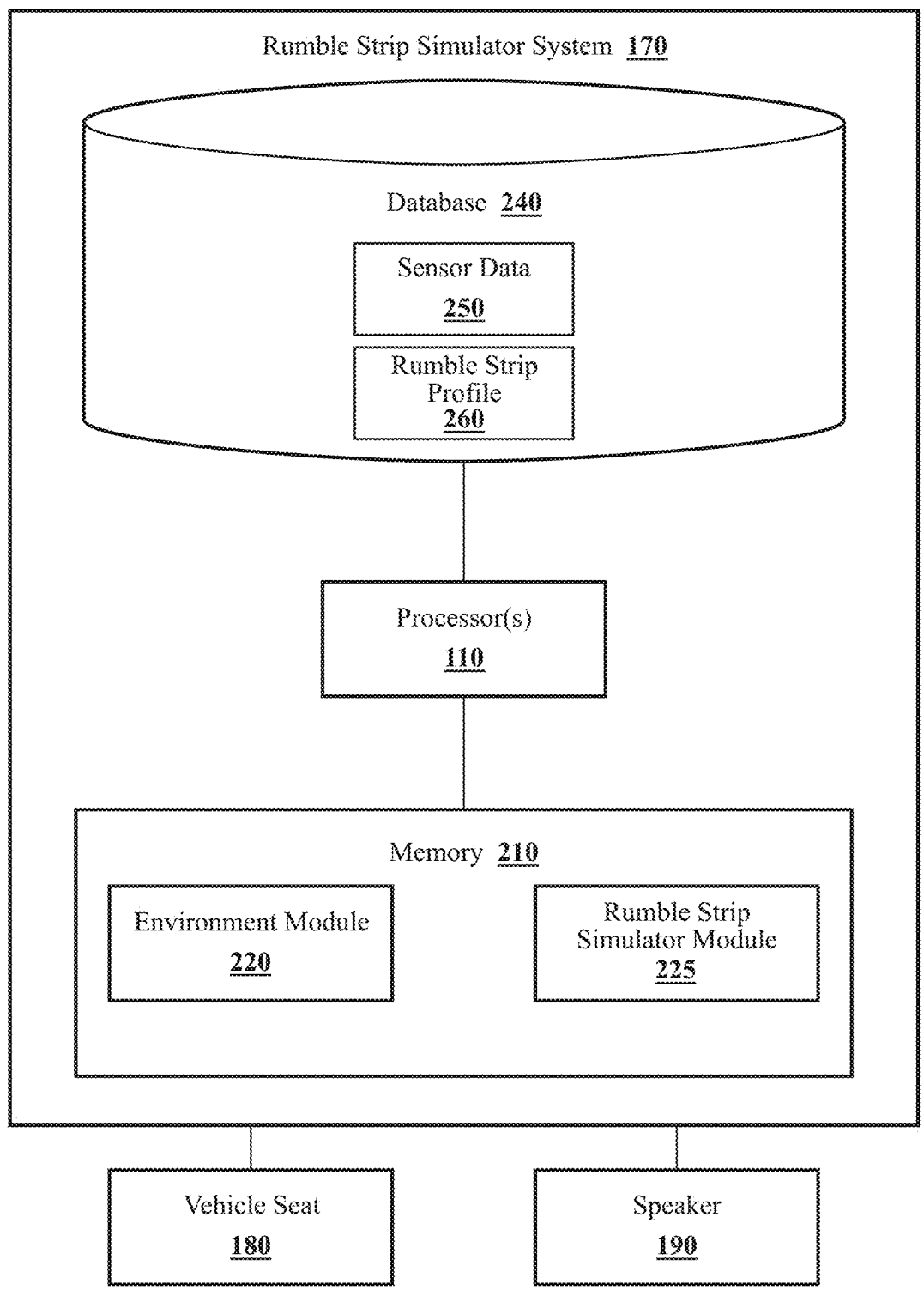
FIG. 2 illustrates one embodiment of a rumble strip simulator system that is associated with generating a response of a vehicle to a virtual rumble strip.

With reference to FIG. 2, one embodiment of the rumble strip simulator system 170 of FIG. 1 is further illustrated. The rumble strip simulator system 170 is shown as including a processor 110 from the vehicle 100 of FIG. 1. Accordingly, the processor 110 may be a part of the rumble strip simulator system 170, the rumble strip simulator system 170 may include a separate processor from the processor 110 of the vehicle 100, or the rumble strip simulator system 170 may access the processor 110 through a data bus or another communication path. In one embodiment, the rumble strip simulator system 170 includes a memory 210 that stores an environment module 220 and a rumble strip simulator module 225. The memory 210 is a random-access memory (RAM), read-only memory (ROM), a hard-disk drive, a flash memory, or other suitable memory for storing the environment module 220 and the rumble strip simulator module 225. The environment module 220 and the rumble strip simulator module 225 are, for example, computer-readable instructions that when executed by the processor 110 cause the processor 110 to perform the various functions disclosed herein.

The rumble strip simulator system 170 as illustrated in FIG. 2 is generally an abstracted form of the rumble strip simulator system 170 and may be implemented between the vehicle 100 and a cloud-computing environment.

With reference to FIG. 2, the environment module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the environment module 220, in one embodiment, acquires sensor data 250 that includes at least camera images. In further arrangements, the environment module 220 acquires the sensor data 250 from further sensors such as radar sensors 123, LIDAR sensors 124, sonar sensors 125, and other sensors as may be suitable for identifying vehicles and locations of the vehicles.

Accordingly, the environment module 220, in one embodiment, controls the respective sensors to provide the data inputs in the form of the sensor data 250. Additionally, while the environment module 220 is discussed as controlling the various sensors to provide the sensor data 250, in one or more embodiments, the environment module 220 can employ other techniques to acquire the sensor data 250 that are either active or passive. For example, the environment module 220 may passively sniff the sensor data 250 from a stream of electronic information provided by the various sensors to further components within the vehicle 100. Moreover, the environment module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the environment module 220, in one embodiment, controls the sensors to acquire the sensor data 250 about an area that encompasses 360 degrees about the vehicle 100 in order to provide a comprehensive assessment of the surrounding environment. Of course, in alternative embodiments, the environment module 220 may acquire the sensor data about a forward direction alone when, for example, the vehicle 100 is not equipped with further sensors to include additional regions about the vehicle 100 and/or the additional regions are not scanned due to other reasons (e.g., unnecessary due to known current conditions).

As will be described in greater detail below, the environment module 220 may be configured to determine establish a virtual boundary, determine that the virtual boundary has been crossed by the vehicle or an object in proximity to the vehicle, and determine information about an environment of the vehicle when the virtual boundary is crossed.

The rumble strip simulator module 225 generally includes instructions that function to control the processor 110 to receive data inputs (e.g., information about an environment of the vehicle 100) from the environment module 220. Based upon the data inputs, the rumble strip simulator module 225 is configured to generate data that, when provided to an actuator, causes the actuator to provide haptic feedback, where the haptic feedback is based upon the information about the environment of the vehicle and a type of virtual rumble strip.

Moreover, in one embodiment, the rumble strip simulator system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the environment module 220 and the rumble strip simulator module 225 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

According to embodiments, the database 240 includes one or more rumble strip profiles 260 (referred to now herein as "the rumble strip profile 260") for a virtual rumble strip. In general, a real-world rumble strip is a road safety feature that alerts an operator of a vehicle of potential dangers by causing a tactile vibration and/or audible rumbling transmitted through the wheels of the vehicle into the vehicle when one or more tires of the vehicle makes contact with the real-world rumble strip while the vehicle is traveling. Real-world rumble strips may be incorporated into or around various road markings (e.g., centerline marking, shoulder marking, etc.) on a road. As such, the rumble strip profile 260 includes data that enables the vehicle 100 to reproduce the tactile vibration and/or audible rumbling even though the vehicle 100 has not actually driven over a real-world rumble strip. In an example, the rumble strip profile 260 may be a profile for one or more of the following types of rumble strips: a centerline rumble strip, a shoulder rumble strip, a transverse rumble strip, a raised pavement marker, Botts' dotts, or any other type of rumble strip that is utilized on roads. According to embodiments, the rumble strip profile 260 may be a profile for gravel or a speed bump.

The rumble strip profile 260 may be experimentally determined. In an example, a vehicle is driven over a real-world rumble strip under various conditions (e.g., different speeds, different headings, etc.). The rumble strip profile 260 is generated based upon haptic and/or audio information generated by sensor systems as the vehicle is driven over the real-world rumble strip.

In general, the rumble strip profile 260 for a type of rumble strip includes data indicative of amplitudes and frequencies of vibrations that are to be generated in order to simulate the vehicle 100 driving over the rumble strip. The rumble strip profile 260 for the type of rumble strip may include data indicative of different amplitudes and/or frequencies of vibrations based upon a speed of a vehicle, a heading of the vehicle, an acceleration of the vehicle, a number of tires of the vehicle that make contact with the rumble strip, a surface area of a tire of the vehicle that makes contact with the rumble strip, weather conditions, an angle of a road on which rumble strip is located, and/or an incline/decline of the road on which the rumble strip is located. The rumble strip profile 260 for the type of rumble strip may also include amplitudes and frequencies of sounds that are to be generated in order to simulate the vehicle 100 driving over the rumble strip. The amplitudes and/or frequencies of the vibrations and/or the sounds may also be based upon physical characteristics of the rumble strip, such as dimensions of the rumble strip, materials that comprise the rumble strip, space between physical elements of the rumble strip, and so forth. The rumble strip profile 260 may also include resonance characteristics of the rumble strip.

In one approach, the environment module 220 uses a machine learning algorithm embedded within the environment module 220, such as a convolutional neural network (CNN), to perform semantic segmentation over the sensor data 250 from which further information is derived. Of course, in further aspects, the environment module 220 may employ different machine learning algorithms or implements different approaches for performing the semantic segmentation which can include deep convolutional encoder-decoder architectures, a multi-scale context aggregation approach using dilated convolutions, or another suitable approach that generates semantic labels for the separate object classes represented in the image. In an example, environment module 220 provides an output with semantic labels identifying objects represented in the sensor data 250.

Figure 3:
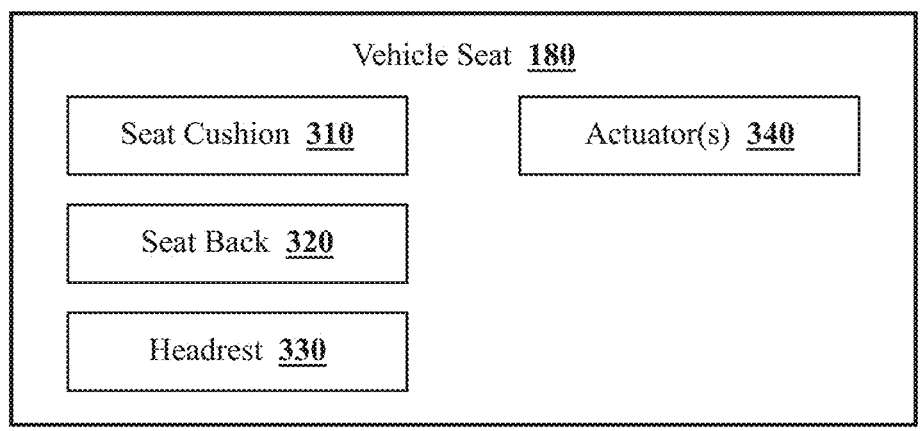
FIG. 3 illustrates a functional block diagram of a vehicle seat according to an embodiment.

Referring now to FIG. 3, a functional block diagram of an example vehicle seat 180 is depicted. The vehicle seat 180 includes a seat cushion 180 that is generally configured to make contact with a posterior of an operator of the vehicle 100 (or a passenger of the vehicle 100) as the operator (or the passenger) sits in the vehicle seat 180. The vehicle seat 180 also includes a seat back 320 that is generally configured to make contact with a back of the operator of the vehicle 100 (or the passenger of the vehicle 100) as the operator (or the passenger) sits in the vehicle seat 180. The vehicle seat 180 may further include a headrest 330 that is generally configured to make contact with a back of a head and/or neck of the operator of the vehicle 100) as the operator (or the passenger) sits in the vehicle seat 180. The vehicle seat 180 also includes one or more actuators 340 (referred to now as "the actuator 340"). In an example, the actuator 340 is configured to deliver haptic feedback to one or more regions of the vehicle seat 180, such as the seat cushion 310, the seat back 320, and/or the headrest 330, where the haptic feedback mimics vibrations the vehicle seat 180 would undergo if one or more tires of the vehicle 100 made contact with a real-world rumble strip as the vehicle 100 traveled. According to embodiments, the actuator 340 is disposed within the seat cushion 310, the seat back 320, and/or the head rest 330. According to embodiments, the actuator 340 is connected to a floor of the vehicle 100 and a frame of the vehicle seat 180. According to the embodiments, the actuator 340 delivers haptic feedback to the frame of the vehicle seat 180

Figure 4:
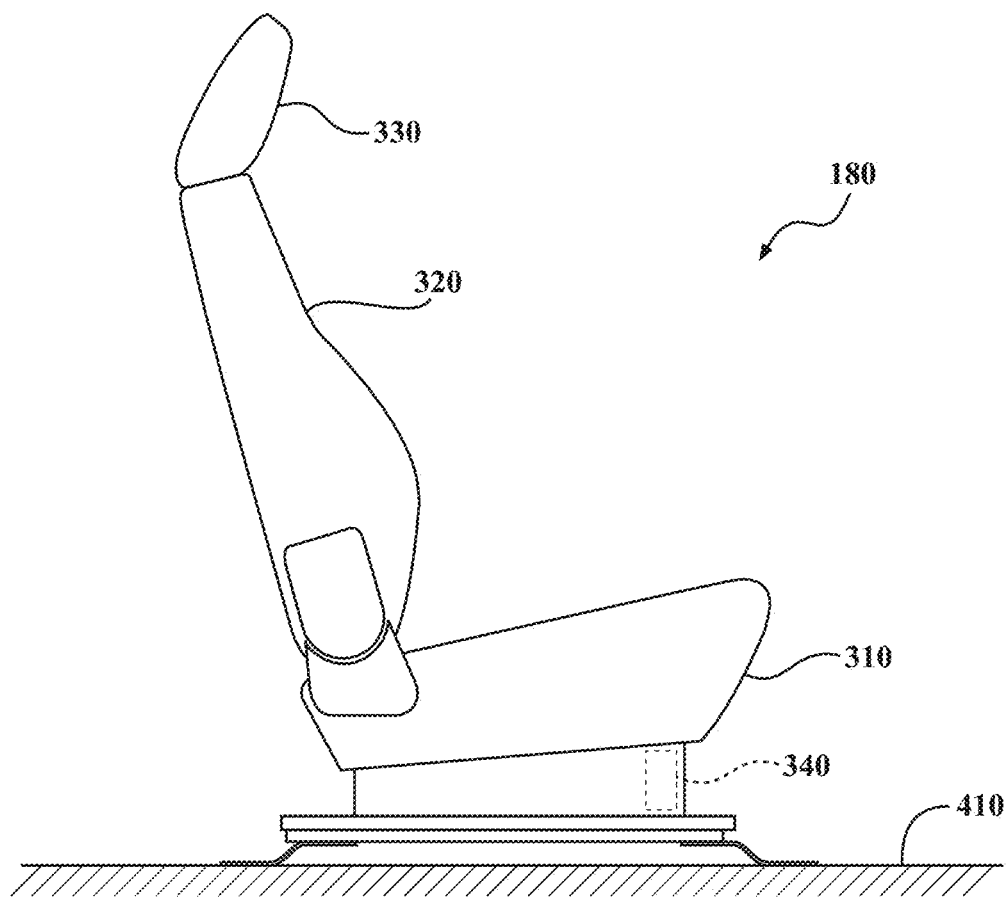
FIG. 4 illustrates a vehicle seat according to an embodiment.

Referring now to FIG. 4, the vehicle seat 180 according to an embodiment is illustrated. As illustrated in FIG. 4, the vehicle seat 180 includes the seat cushion 310, the seat back 320, and the headrest 330. Furthermore, as illustrated in FIG. 4, the actuator 340 is connected to a floor 410 of the vehicle 100 and the seat cushion 310.

Operation of the rumble strip simulator system 170 is now set forth. It is contemplated that the vehicle 100 is moving about an environment while being operated by an operator (i.e., a driver). As the vehicle 100 moves about the environment, the sensor systems 120 generate sensor data (e.g., the sensor data 250) that is indicative of features of the environment of the vehicle 100.

The environment module 220 (or another module of the vehicle 100) establishes a virtual boundary based upon the sensor data (e.g., the sensor data 250) generated by the sensor systems 120. The environment module 220 may also establish the virtual boundary based upon data determined from the sensor data, data received from an external source, and/or non-sensor data. The virtual boundary corresponds to a real-world location in proximity of the vehicle 100. The virtual boundary may enclose a virtual area, where the virtual area corresponds to a real-world area that includes the vehicle 100 or an object. The virtual area may be of any shape. In general, when the vehicle 100 and/or the object in proximity of the vehicle 100 cross the virtual boundary, the vehicle 100 and/or the object are at risk of an adverse event. The object may be another vehicle, a pedestrian, debris, a road marking, a road sign, etc. According to examples, the adverse event may be collision of the vehicle 100 with the object, departure of the vehicle 100 from a lane on a road onto another lane, such as a lane of on-coming traffic, departure of the vehicle 100 from the road onto an off-road area, or exceeding a mandated or recommended speed limit.

As such, the environment module 220 (or another module of the vehicle 100) establishes the virtual boundary such that when the vehicle 100 or an object in proximity of the vehicle 100 crosses the real-world location corresponding to the virtual boundary, the rumble strip simulator module 225 is able to warn the operator of the vehicle 100 through haptic feedback and/or audio feedback that simulates a rumble strip such that the operator of the vehicle 100 is able to adjust a speed and/or heading of the vehicle 100 to avoid the adverse event. Stated differently, the environment module 220 establishes the virtual boundary such that the operator has sufficient time to react to the haptic and/or audio feedback. In an example, the virtual boundary encloses a road marking in proximity of the vehicle 100, such as a shoulder marking. In another example, the virtual boundary encloses a pedestrian in proximity of the vehicle 100. Although the virtual boundary corresponds to a real-world location in proximity of the vehicle 100, the real-world location may not have distinguishing or identifiable features from the perspective of the operator of the vehicle 100. For instance, in an example, the virtual boundary may enclose a real-world area that is adjacent to a road marking, but that does not include the road marking itself.

As noted above, the environment module 220 (or another module of the vehicle 100) establishes the virtual boundary based upon the sensor data. The sensor data includes sensor data generated by vehicle sensors 121 of the vehicle 100 and/or sensor data generated environment sensors 122 of the vehicle 100. Example types of sensor data generated by the vehicle sensors 121 include a speed of the vehicle 100, a heading of the vehicle 100, a position of the vehicle 100 (e.g., global positioning system (GPS) coordinates), and/or an acceleration of the vehicle 100. Example types of sensor data generated by the environment sensors include radar data, LIDAR point clouds, sonar data, and camera images.

As noted above, the environment module 220 (or another module of the vehicle 100) may establish the virtual boundary based upon data determined from the sensor data. For instance, the environment module 220 employs various algorithms and/or machine learning models to classify one or more objects in an image (where the image is part of the sensor data), classify the environment of the vehicle 100 in the image, and so forth. As such, the environment module 220 may establish the virtual boundary based upon classifications of objects, classifications of the environment of the vehicle 100, etc. Furthermore, the environment module 220 may determine an angle of a road, an incline/decline of the road, weather conditions, etc. based upon the sensor data.

The environment module 220 (or another module of the vehicle 100) may also establish the virtual boundary based additionally upon data received from an external source and/or non-sensor related data. The data may include a time of day that the vehicle 100 is traveling, a day of the year that the vehicle 100 is traveling, weather conditions around the vehicle 100, a speed limit of the environment, and/or a map of the environment (e.g., a high-definition map).

According to embodiments, the environment module 220 (or another module of the vehicle 100) establishes the virtual boundary based upon at least one of the following parameters: a speed of the vehicle 100, a heading of the vehicle 100, an acceleration of the vehicle 100, a position of an object in proximity of the vehicle 100, a distance between the vehicle 100 and the object, a heading of the object, an acceleration of the object, weather conditions around the vehicle 100, a predicted time to collision of the vehicle 100 with the object (or a predicted time to intercept when the object is a road marking), a time of day, a day of the month, a type of road (e.g., rural, country) on which the vehicle 100 is traveling, a composition of the road (e.g., brick, gravel, etc.), an angle of the road, an incline/decline of the road, a map of the environment, a speed limit, a classification of the object, and/or a classification of the environment.

In an example, the environment module 220 establishes the virtual boundary based upon a location of a road marking (e.g., a shoulder marking) in proximity of the vehicle 100, where the location of the road marking is determined based upon the first sensor data. For instance, the environment module 220 may establish the virtual boundary to encompass a virtual area next to the location of the road marking. As will be described in greater detail below, establishing the virtual area next to the location of the road marking enables the environment module 220 to provide haptic and/or audio feedback before the vehicle 100 reaches the road marking so that the operator can control the vehicle 100 to avoid an adverse event (e.g., driving off-road). The environment module 220 may also establish the virtual boundary to encompass the road marking. This is advantageous in scenarios in which the road marking is on a road that lacks a physical rumble strip.

It is to be understood that the environment module 220 (or another module of the vehicle 100) may dynamically establish and reestablish the virtual boundary at different timesteps as the vehicle 100 travels about the environment using the parameters described above. In an example, when the vehicle 100 travels at a first speed at a first timepoint, the environment module 220 establishes a first virtual boundary that encloses a first virtual area. However, when the vehicle 100 travels at a second speed that is greater than the first speed at a second timepoint occurring after the first timepoint, the environment module 220 establishes a second virtual boundary that encloses a second virtual area. The second virtual area is larger than the first virtual area (and hence is located closer to the vehicle 100 than the first virtual area) so that the operator of the vehicle 100 can be warned earlier to avoid an adverse event.

The environment module 220 determines that the vehicle 100 and/or an object in proximity of the vehicle 100 has crossed the virtual boundary based upon first sensor data generated by the sensor systems 120 of the vehicle 100. Additionally, the environment module 220 may determine that the vehicle 100 and/or the object has crossed the virtual boundary based upon first data determined from the first sensor data. In an example, the environment module 220 ascertains a location of the vehicle 100 from data from the vehicle sensor(s) 121, such as GPS coordinates. The environment module 220 determines that the vehicle 100 has crossed the virtual boundary when the location of the vehicle 100 overlaps at least in part with the real-world location corresponding to the virtual boundary. In another example, the environment module 220 determines a location of an object based upon sensor data generated by the environment sensor(s) 122. The environment module 220 determines that the object has crossed the virtual boundary based upon a comparison of the location of the object to the real-world location corresponding to the virtual boundary.

Although the environment module 220 has been described above as establishing the virtual boundary and determining that the vehicle 100 and/or the object has crossed the virtual boundary separately, other possibilities are contemplated. According to embodiments, the environment module 220 simultaneously establishes the virtual boundary and determines that the virtual boundary has been crossed based upon one or more of the parameters listed above.

Upon determining that the vehicle 100 and/or the object has crossed the virtual boundary, the environment module 220 determines information about the environment of the vehicle 100 based upon second sensor data generated by the sensor systems 120. The environment module 220 may additionally determine the information about the environment based upon second data determined from the second sensor data, second data received from an external source, and/or second non-sensor related data. The information about the environment of the vehicle 100 may include at least one of the parameters described above. Furthermore, the second sensor data may include some or all of the first sensor data. Additionally, the information about the environment of the vehicle 100 may also include a number of tires of the vehicle 100 that cross the real-world location corresponding to the virtual boundary and/or a surface area of one or more of the tires that makes contact with a real-world area corresponding to the virtual area defined by the virtual boundary.

According to embodiments, the rumble strip simulator module 225 selects a type of virtual rumble strip based upon the information about the environment of the vehicle 100. The rumble strip simulator module 225 may receive the information about the environment of the vehicle 100 from the environment module 220. Alternatively, the rumble strip simulator module 225 may select the type of virtual rumble strip based upon the sensor data generated by the sensor systems 120 when the virtual boundary is established. According to embodiments, rumble strip simulator module 225 selects the rumble strip profile 260.

In one example, the rumble strip simulator module 225 receives an image of a road on which the vehicle 100 is traveling, where the image includes a marking that divides a first lane and a second lane of the road, where the first lane includes traffic that moves in a first direction and where the second lane includes traffic that moves in a second direction that is opposite of the first direction. The rumble strip simulator module 225 classifies the marking as a centerline marking using a machine learning model. The rumble strip simulator module 225 selects a centerline rumble strip upon classifying the marking as the centerline marking.

In general, the rumble strip simulator module 225 seeks to recreate haptic feedback and/or audio feedback that would be experienced by the operator of the vehicle 100 if the vehicle 100 drove over a physical rumble strip of the same type as the virtual rumble strip. As such, the rumble strip simulator module 225 enables the operator of the vehicle 100 to experience the same full-body sensations produced when the vehicle 100 drives over a physical rumble strip while at the same time giving the operator time to react and maneuver the vehicle 100 to a safe area.

The rumble strip simulator module 225 activates the actuator 340 of the vehicle seat 180 such that haptic feedback is delivered to the vehicle seat 180 by the actuator 340, where the haptic feedback is based upon the information about the environment of the vehicle 100 and the type of the virtual rumble strip. For instance, the haptic feedback may be based upon a speed of the vehicle 100 when the vehicle 100 crosses the virtual boundary and an orientation of the vehicle 100 with respect to the virtual boundary (e.g., parallel or at angle) when the vehicle 100 crosses the virtual boundary. According to embodiments, the rumble strip simulator module 225 transmits a signal to the actuator 340 which activates the actuator 340, where the signal is based upon data within the rumble strip profile 260. According to embodiments, the signal is additionally based upon the information about the environment of the vehicle 100. In an example, the haptic feedback includes vibrations that have a frequency and an amplitude that mimic vibrations that the vehicle 100 would undergo if the vehicle 100 drove over a real-world rumble strip of the same type as the virtual rumble strip at the speed and direction in which the vehicle 100 is currently traveling. It is contemplated that the operator of the vehicle 100 sits in the vehicle seat 180; however, the vehicle seat 180 may also be a passenger seat.

The rumble strip simulator module 225 may also activate the speaker 190 such that audio feedback is provided to the operator of the vehicle 100. The audio feedback is based upon the information about the environment of the vehicle 100 and the type of the virtual rumble strip. According to embodiments, rumble strip simulator module 225 transmits data from the rumble strip profile 260 which causes the speaker 190 to emit the audio feedback. In an example, the audio feedback has a frequency and an amplitude that mimics sounds that would be heard by the operator of the vehicle 100 if the vehicle 100 drove over a real-world rumble strip of the same type as the virtual rumble strip at the speed and direction in which the vehicle 100 is currently traveling.

In an example, the actuator 340 deliver vibrations at a first frequency and a first amplitude when the vehicle 100 travels at a first speed and the actuator 340 deliver vibrations at a second frequency and a second amplitude when the vehicle 100 travels at a second speed. Furthermore, the first frequency, the first amplitude, the second frequency, and the second amplitude are based upon the type of the virtual rumble strip.

In an example, if the vehicle 100 is traveling relatively fast when the virtual boundary is crossed, the actuator 340 delivers vibrations at a relatively high frequency. In contrast, if the vehicle 100 is traveling relatively slow when the virtual boundary is crossed, the actuator 340 delivers vibrations at a relatively low frequency. Similarly, if the vehicle 100 is traveling relatively fast when the virtual boundary is crossed, the speaker 190 emits sounds at a relatively high frequency. In contrast, if the vehicle 100 is traveling relatively slow when the virtual boundary is crossed, the speaker 190 emits sounds at a relatively low frequency.

In another example, the haptic feedback is based upon a type of road marking that is enclosed by or adjacent to the virtual boundary. For instance, when the virtual boundary is located adjacent to a centerline marking, the actuator 340 delivers vibrations at a first amplitude and a first frequency. However, when the virtual boundary is located adjacent to a reflector patch that separates lanes in which traffic travels in the same direction, the actuator 340 delivers vibrations at a second amplitude and a second frequency, where the first amplitude is greater than the second amplitude and where the first frequency is greater than the second frequency. As a result, the operator of the vehicle experiences more intense vibrations in scenarios where a risk to the operator is relatively high (e.g., risking a head-on collision by traveling into on-coming traffic) and less intense vibrations in scenarios where the risk to the operator is relatively low (e.g., changing lanes).

It is to be understood that the haptic feedback and/or audio feedback provided by the rumble strip simulator module 225 may be dynamic and may change over time as the vehicle 100 crosses the virtual boundary into the virtual area. In an example, the haptic feedback may include vibrations at a first amplitude and a first frequency when a first tire of the vehicle 100 crosses the virtual boundary. In the example, the haptic feedback may include vibrations at a second amplitude and a second frequency when a second tire (in addition to the first tire) of the vehicle 100 crosses the virtual boundary.

According to embodiments in which the virtual boundary defines a virtual area, it its contemplated that the actuator 340 continues to provide haptic feedback and/or audio feedback as long as at least one tire of the vehicle 100 makes contact with the real-world area corresponding to the virtual area, where the haptic feedback and/or audio feedback may change as the vehicle 100 progresses through the real-world area based upon changes in the information about the environment of the vehicle 100. According to other embodiments in which the virtual boundary does not define a virtual area, the actuator 340 provides haptic feedback and/or audio feedback for a predetermined period of time.

It is to be understood that the haptic feedback and/or audio feedback may be distracting to passengers of the vehicle 100 who are not the operator of the vehicle 100. For instance, the haptic feedback provided to the vehicle seat 180 in which the operator sits may also be experienced by passenger seats. Additionally, the haptic feedback may also generate noise that can be perceived by the passengers. Furthermore, the audio feedback described above may be heard by the passengers as well.

As such, according to embodiments, the rumble strip simulator module 225 eliminates structure-borne noise that is transmitted to passenger seats by adaptively decoupling passenger seats from a chassis of the vehicle 100. The rumble strip simulator module 225 may also eliminate structure-borne noise by counteracting vibrations with an active damping system that is located between the passenger seats and the chassis such that the passenger seats do not undergo the haptic feedback delivered to the vehicle seat 180. For instance, the rumble strip simulator module 225 may cause an actuator in a passenger seat to emit vibrations that have an opposite amplitude and frequency to the vibrations directed towards the vehicle seat 180 in which the operator sits. According to embodiments, airborne noise (i.e., noise generated by the haptic feedback) can be eliminated by active noise canceling. According to embodiments, the speaker 190 is a directional speaker that emits audio feedback that can be heard only by a person located in a driver's seat of the vehicle 100.

According to embodiments, the rumble strip simulator module 225 may selectively determine not to provide the haptic feedback and/or the audio feedback described above based upon the information about the environment of the vehicle 100. In an example, when the virtual boundary is crossed by vehicle 100, the rumble strip simulator module 225 determines whether or not to provide the feedback based upon a comparison of the speed of the vehicle 100 to a threshold speed, such as a speed limit. In an example, when the speed of the vehicle 100 exceeds the threshold speed, the rumble strip simulator module 225 provides the haptic and/or the audio feedback as described above. However, in the example, when the speed of the vehicle 100 is equal to or less than the threshold speed, the rumble strip simulator module 225 does not provide the haptic and/or audio feedback. In another example, when the virtual boundary is crossed by vehicle 100, the rumble strip simulator module 225 determines whether or not to provide the feedback based upon a time of day and/or a day of a year. In an example, when the time and day of the year correspond to a school day, the rumble strip simulator module 225 provides the haptic and/or audio feedback as described above. However, in the example, when the time and day do not correspond to a school day, the rumble strip simulator module 225 does not provide the haptic feedback and/or the audio feedback.

According to embodiments, the rumble strip simulator module 225 determines whether or not a physical rumble strip is located at a real-world location corresponding to the virtual boundary and/or a real-world area corresponding to the virtual area based upon sensor data. When the physical rumble strip is absent, the rumble strip simulator module 225 operates as described above to provide haptic feedback and/or audio feedback. However, when the physical rumble strip is located at the real-world location and/or the real-world area, the rumble strip simulator module 225 does not provide the haptic feedback and/or the audio feedback as described above. In this manner, the rumble strip simulator module 225 prevents the operator of the vehicle 100 from being overwhelmed by a combination of feedback from the physical rumble strip and the virtual rumble strip.

According to embodiments, the vehicle 100 includes a system that monitors the operator of the vehicle 100. In an example, the system determines an alertness level of the operator based upon images of the operator captured as the operator operates the vehicle 100. According to the embodiments, the rumble strip simulator module 225 activates the actuator 340 and/or the speaker 190 to deliver the haptic feedback and/or the audio feedback, respectively, when the rumble strip simulator module 225 receives data indicating that the operator is not alert.

Figure 5A:
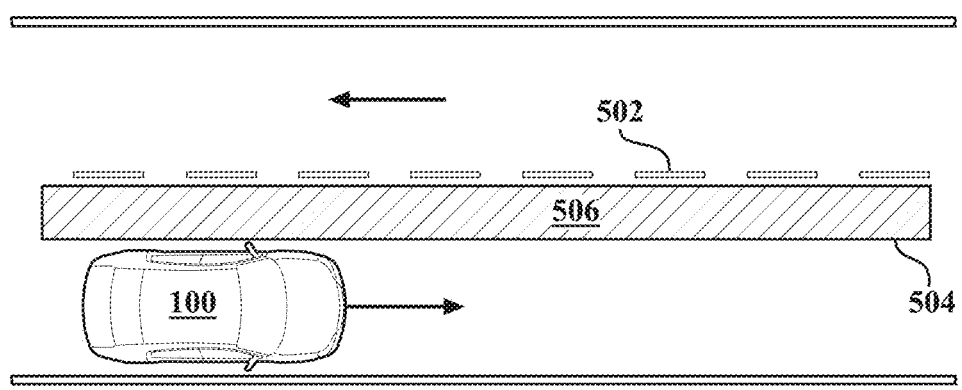
FIGS. 5A-C illustrate a scenario in which a rumble strip is simulated to warn an operator of a vehicle of a predicted lane departure.
Figure 5B:
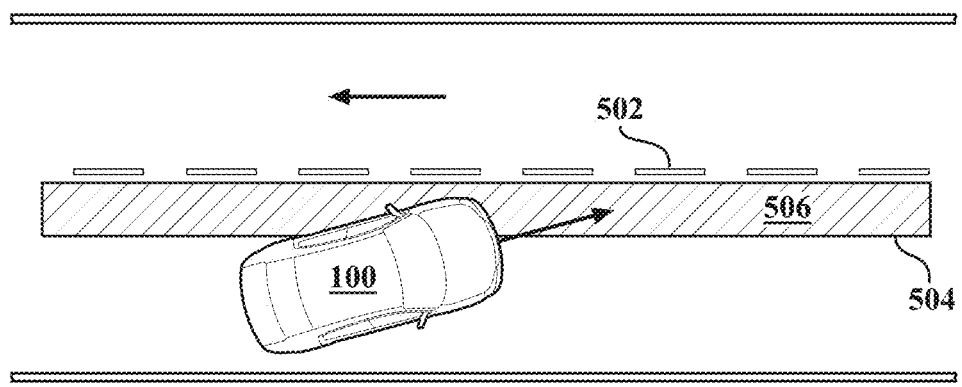

FIGS. 5A-B depict a scenario in which a rumble strip is simulated to warn an operator of the vehicle 100 of a predicted lane departure. Referring now to FIG. 5A, the vehicle 100 is traveling on a two-way road at a first timepoint. The two-way road includes a centerline marking 502 (depicted as a dotted line). It is undesirable for the vehicle 100 to cross the centerline marking 502 due to the presence of on-coming traffic. Using the processes described above, the rumble strip simulator module 225 establishes a virtual boundary 504 that encloses a virtual area 506, where the virtual area 506 corresponds to a real-world area next to the centerline marking 502. The real-world area may not have any unique or distinguishing characteristics from the perspective of the operator of the vehicle 100, that is, the real-world area may simply appear as a portion of road next to the centerline marking 502. Furthermore, real-world rumble strips may be absent from the real-world area and/or the centerline marking 502. The rumble strip simulator module 225 may determine a type of virtual rumble strip as described above. In an example, the type is centerline rumble strip. As depicted in FIG. 5A, the vehicle 100 has not crossed the virtual boundary 504, and as such, the rumble strip simulator module 225 does not activate the actuator 340 to provide haptic feedback and/or audio feedback.

Referring now to FIG. 5B, the vehicle 100 has crossed the virtual boundary 504 at a second timepoint that occurs subsequent to the first timepoint. Using the processes described above, the rumble strip simulator module 225 determines information about the environment of the vehicle 100 based upon sensor data generated by the sensor systems 120 of the vehicle 100. The rumble strip simulator module 225 transmits a signal to the actuator 340 which causes the actuator 340 to deliver haptic feedback to the vehicle seat 180 of the vehicle 100, where the haptic feedback is based upon the information about the environment of the vehicle 100 and the type of the virtual rumble strip. In an example, the information about the environment of the vehicle 100 includes a speed of the vehicle 100. In the example, the haptic feedback is a vibration that has a frequency and an amplitude that mimics a vibration that the vehicle seat 180 would undergo if the vehicle 100 drove over a real-world centerline rumble strip at the speed. The rumble strip simulator module 225 may also cause the speaker 190 to emit audio feedback that is based upon the information about the environment of the vehicle 100 and the type of the virtual rumble strip. Following the example given above, the audio feedback has an amplitude and/or frequency that mimics sound that would be produced if the vehicle 100 drove over a real-world centerline rumble strip at the speed. In the example depicted in FIG. 5B, the rumble strip simulator module 225 provides the haptic feedback and/or the audio feedback prior to the vehicle 100 actually reaching the centerline marking 502 in order to enable the operator of the vehicle 100 to adjust a speed and/or heading of the vehicle 100 to avoid crossing the centerline marking 502 into a lane of on-coming traffic.

Figure 5C:
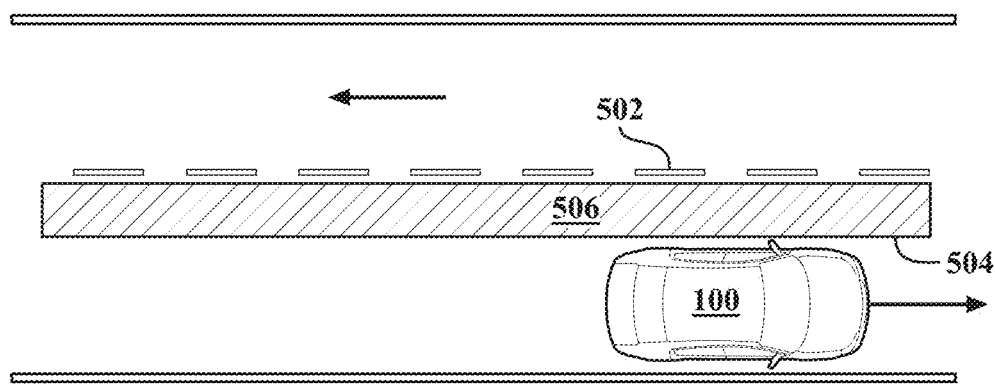

Referring now to FIG. 5C, the operator of the vehicle 100 has reacted to the haptic feedback and/or the audio feedback and has driven the vehicle 100 outside of the virtual area 506 into a safe area. As such, the rumble strip simulator module 225 no longer provides the haptic feedback and/or the audio feedback described above.

Figure 6A:
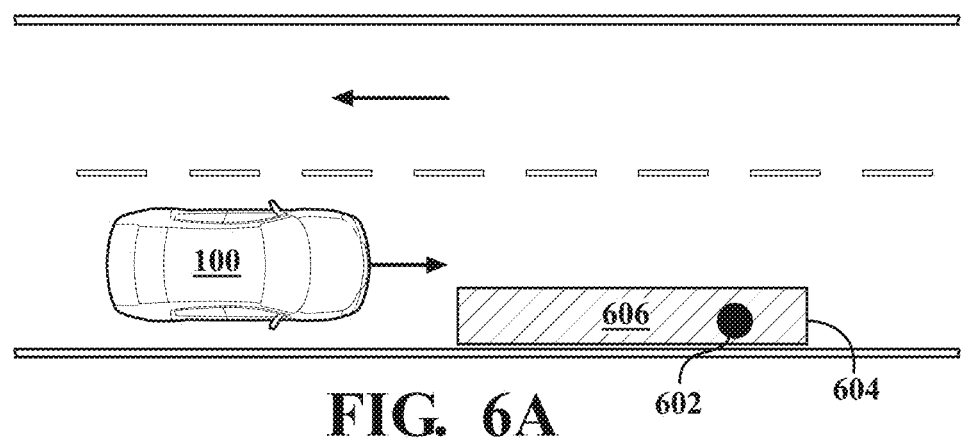
FIGS. 6A-C illustrate a scenario in which a rumble strip is simulated to warn an operator of a vehicle of an object in proximity to the vehicle.
Figure 6B:
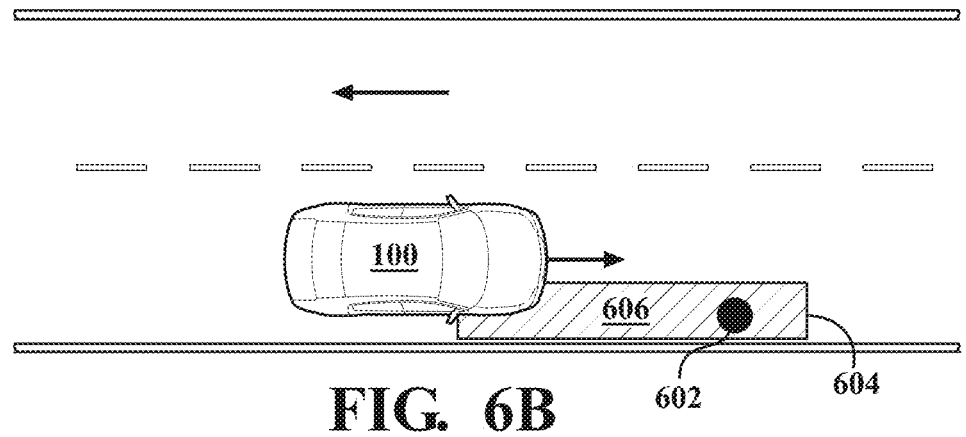
Figure 6C:
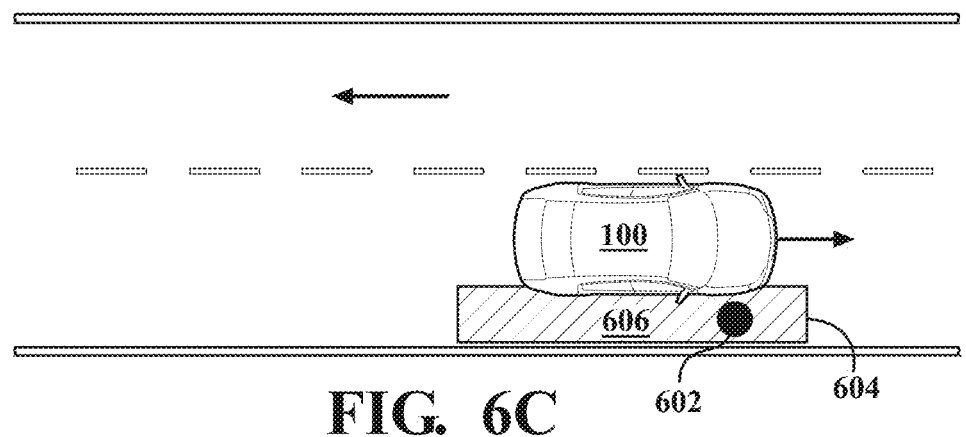

FIGS. 6A-C depict a scenario in which a rumble strip is simulated to warn an operator of the vehicle 100 of an object in proximity to the vehicle 100. Referring now to FIG. 6A, the vehicle 100 is traveling on a road at a first timepoint. An object 602 (e.g., a pedestrian, another vehicle, debris, etc.) is located on the road. Using the processes described above, the rumble strip simulator module 225 establishes a virtual boundary 604 that encloses a virtual area 606, where the virtual area 606 corresponds to a real-world area that encompasses the object 602. The rumble strip simulator module 225 may determine a type of virtual rumble strip based upon sensor data generated by the sensor systems 120 of the vehicle 100. In one example, the type is a transverse rumble strip. In another example, the type is a shoulder rumble strip. In yet another example, the type is a combination of a transverse rumble strip and a shoulder rumble strip. As depicted in FIG. 5A, the vehicle 100 has not crossed the virtual boundary 604, and as such, the rumble strip simulator module 225 does not activate the actuator 340 to provide haptic feedback and/or audio feedback.

Referring now to FIG. 6B, the vehicle 100 has crossed the virtual boundary 604 at a second timepoint that occurs subsequent to the first timepoint. Using the processes described above, the rumble strip simulator module 225 determines information about the environment of the vehicle 100 based upon sensor data generated by the sensor systems 120 of the vehicle 100. The rumble strip simulator module 225 transmits a signal to the actuator 340 which causes the actuator 340 to deliver haptic feedback to the vehicle seat 180 of the vehicle 100, where the haptic feedback is based upon the information about the environment of the vehicle 100 and the type of the virtual rumble strip. In one example, the haptic feedback includes vibrations at a frequency and an amplitude that mimic a transverse rumble strip in order to induce the operator of the vehicle 100 to reduce a speed of the vehicle 100. In another example, the haptic feedback includes vibrations at a frequency and an amplitude that mimic a shoulder rumble strip to induce the operator of the vehicle 100 to veer the vehicle 100 to the left to avoid the object 602. In yet another example, the haptic feedback includes vibrations at a frequency and an amplitude that mimic a combination of a transverse rumble strip and a shoulder rumble strip. In an example in which only a front right tire of the vehicle 100 crosses the virtual boundary 604, the haptic feedback includes vibrations at a frequency and an amplitude that mimic the front right tire making contact with a rumble strip. The rumble strip simulator module 225 may also generate audio feedback as described above. The environment module 220 defines the virtual boundary 604 such that the operator of the vehicle 100 has sufficient time to adjust a speed and/or heading of the vehicle 100 to avoid the object 602.

Referring now to FIG. 6C, the operator of the vehicle 100 has reacted to the haptic feedback and/or the audio feedback and has driven the vehicle 100 outside of the virtual area 606 into a safe area. As such, the rumble strip simulator module 225 no longer provides the haptic and/or the audio feedback described above.

Figure 7A:
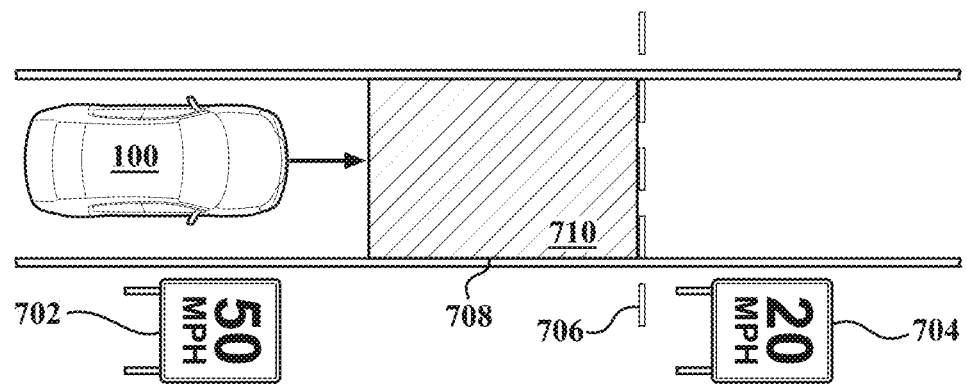
FIGS. 7A-C illustrate a scenario in which a rumble strip is simulated to advise an operator of a vehicle to reduce a speed of the vehicle.
Figure 7B:
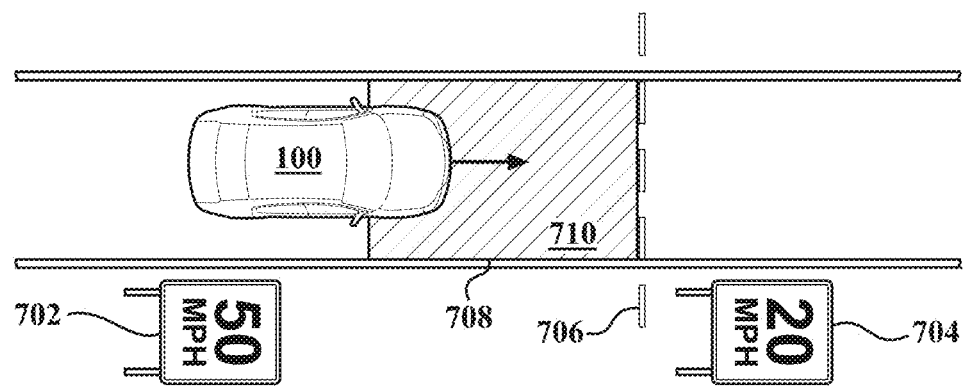
Figure 7C:
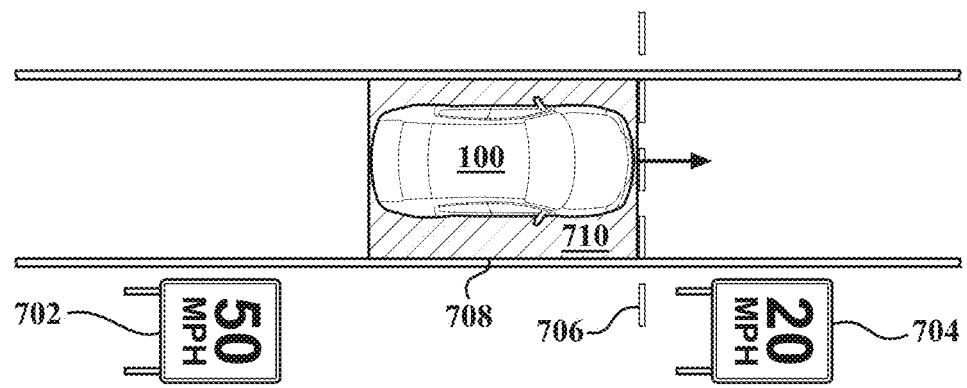

FIGS. 7A-C illustrate a scenario in which a rumble strip is simulated to advise an operator of the vehicle 100 to reduce a speed of the vehicle 100. Referring now to FIG. 7A, the vehicle 100 is traveling on a road at a first timepoint in a 50 miles per hour (MPH) zone 702. In an example, the vehicle 100 is traveling at 50 MPH. A 20 MPH zone 704 is located in a path of the vehicle 100. A marker 706 (e.g., a speed limit sign) separates the first 50 MPH zone 702 from the 20 MPH zone 704. Using the processes described above, the environment module 220 establishes a virtual boundary 708 that encloses a virtual area 710, where the virtual area 710 is located adjacent to the marker 706. The rumble strip simulator module 225 may determine a type of virtual rumble strip based upon sensor data generated by the sensor systems 120 of the vehicle 100. In one example, the type is a transverse rumble strip. As depicted in FIG. 7A, the vehicle 100 has not crossed the virtual boundary 708, and as such, the rumble strip simulator module 225 does not activate the actuator 340 to provide haptic feedback and/or audio feedback.

Referring now to FIG. 7B, the vehicle 100 has crossed the virtual boundary 708 at a second timepoint that occurs subsequent to the first timepoint. Using the processes described above, the environment module 220 determines information about the environment of the vehicle 100 based upon sensor data generated by the sensor systems 120 of the vehicle 100. The rumble strip simulator module 225 transmits a signal to the actuator 340 which causes the actuator 340 to deliver haptic feedback to the vehicle seat 180 of the vehicle 100, where the haptic feedback is based upon the information about the environment of the vehicle 100 and the type of the virtual rumble strip. In an example, the haptic feedback includes vibrations at a frequency and amplitude that mimic a transverse rumble strip in order to induce the operator of the vehicle 100 to reduce a speed of the vehicle 100. In an example in which front tires of the vehicle 100 are in the virtual area 710 but not back tires of the vehicle 100, the haptic feedback includes vibrations at a frequency and amplitude that mimic the front tires of the vehicle 100 making contact with a transverse rumble strip. The rumble strip simulator module 225 may also generate audio feedback as described above.

Referring now to FIG. 7C, an entirety of the vehicle 100 is now within the virtual area 710 at a third timepoint occurring subsequent to the second timepoint. As such, the haptic feedback includes vibrations at a frequency and amplitude that mimic both the front tires and rear tires of the vehicle 100 making contact with a transverse rumble strip.

Figure 8A:
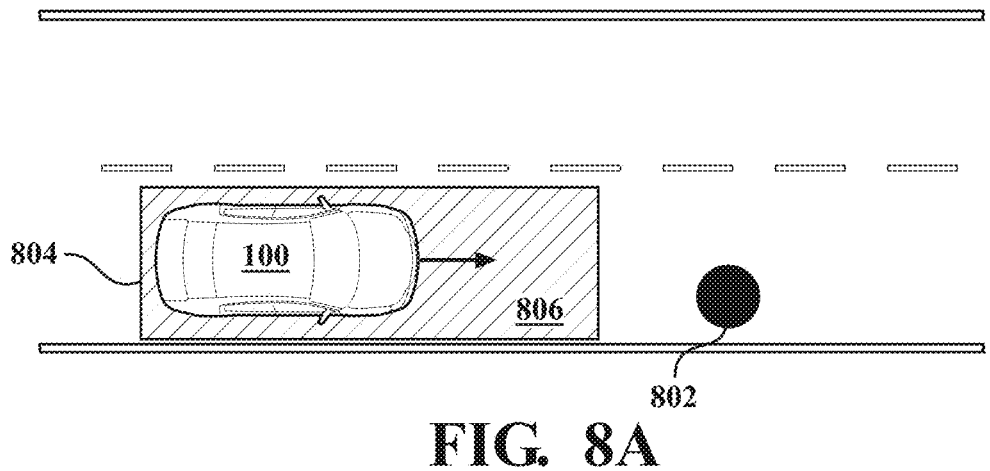
FIGS. 8A-B illustrate a scenario in which a rumble strip is simulated to warn an operator of the vehicle that a safety envelope of the vehicle has been crossed.
Figure 8B:
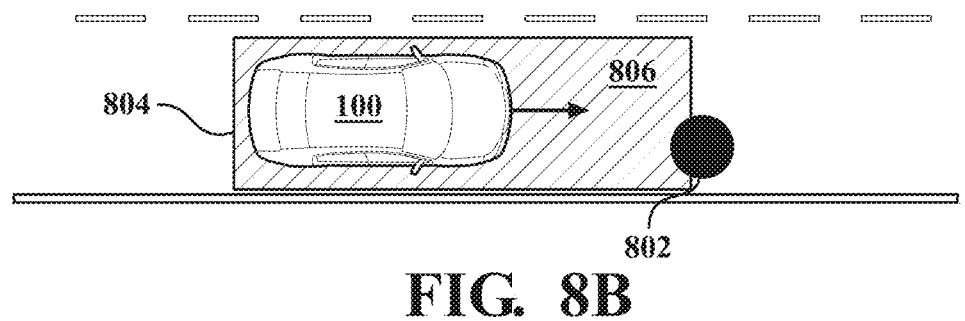

FIGS. 8A-B illustrate a scenario in which a rumble strip is simulated to warn an operator of the vehicle 100 that a safety envelope of the vehicle 100 has been crossed. Referring now to FIG. 8A, the vehicle 100 is traveling on a road at a first position at a first timepoint. An object 802 (e.g., a pedestrian, another vehicle, debris, etc.) is located on the road. The object 802 may be mobile or stationary. Using the processes described above, the environment module 220 establishes a virtual boundary 804 that encloses a virtual area 806, where the virtual area 806 encompasses the vehicle 100. The virtual area 806 may be referred to as a safety envelope. The environment module 220 may dynamically establish/re-establish the virtual boundary 804 (and hence the virtual area 806) as the vehicle 100 moves along the road.

Referring now to FIG. 8B, the vehicle 100 has traveled to a second position on the road at a second timepoint occurring subsequent to the first timepoint. The environment module 220 determines that the virtual boundary 804 has been crossed by the object 802 as described above. For instance, movement of the vehicle 100 causes the object 802 to cross the virtual boundary 804. The environment module 220 determines information about the environment of the vehicle 100 as described above. The rumble strip simulator module 225 transmits a signal to the actuator 340 which causes the actuator 340 to deliver haptic feedback to the vehicle seat 180 of the vehicle 100, where the haptic feedback is based upon the information about the environment of the vehicle 100 and a type of the virtual rumble strip. The rumble strip simulator module 225 may determine the type of the virtual rumble strip upon establishing the virtual boundary 804/virtual area 806 or upon determining that the virtual boundary 804 has been crossed by the object. The rumble strip simulator module 225 may also generate audio feedback as described above.

Figure 9:
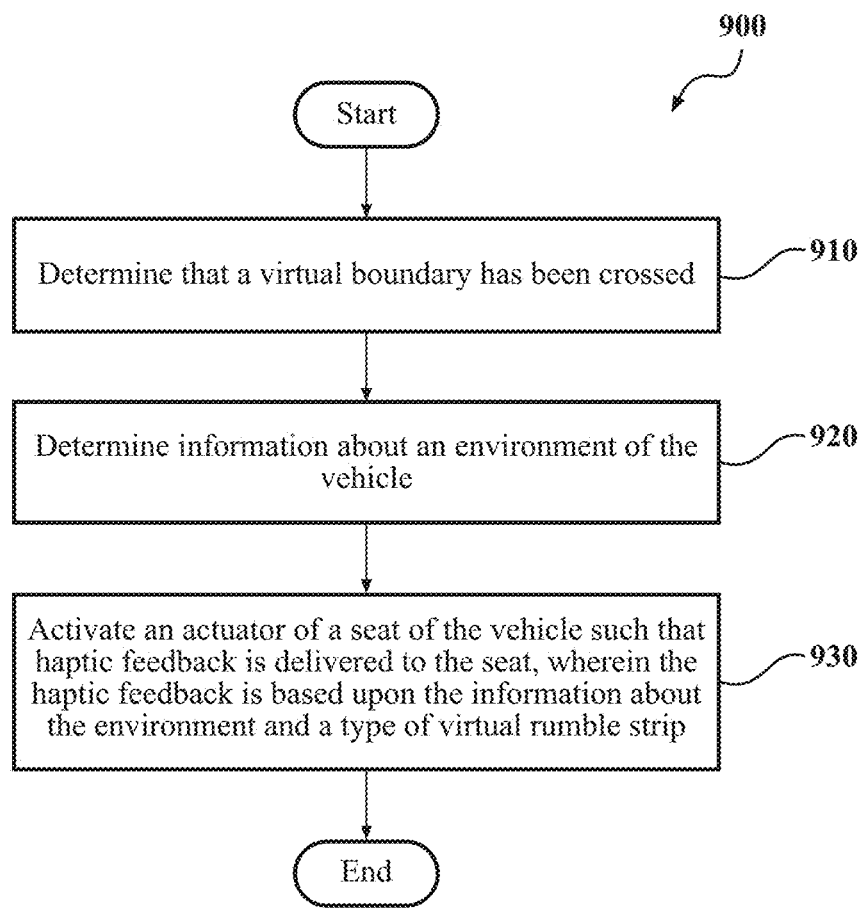
FIG. 9 illustrates one embodiment of a method that is associated with simulating a response of a vehicle to a virtual rumble strip.

FIG. 9 illustrates a flowchart of a method 900 that is associated with simulating a vehicle response to a rumble strip. The method 900 will be discussed from the perspective of the rumble strip simulator system 170 of FIGS. 1 and 2. While the method 900 is discussed in combination with the rumble strip simulator system 170, it should be appreciated that the method 900 is not limited to being implemented within the rumble strip simulator system 170 but is instead one example of a system that may implement the method 900.

At 910, the rumble strip simulator system 170 determines that a virtual boundary corresponding to a real-world location in proximity of the vehicle 100 has been crossed based upon first sensor data generated by the vehicle 100. The virtual boundary may be crossed by the vehicle 100 or an object in proximity of the vehicle 100.

At 920, the rumble strip simulator system 170 determines information about the environment of the vehicle 100 as the virtual boundary is crossed based upon second sensor data generated by the vehicle 100. As described above, the information about the environment of the vehicle 100 may include a speed of the vehicle 100, a heading of the vehicle 100, weather conditions around the vehicle 100, classifications of objects in the environment of the vehicle 100, etc.

At 930, the rumble strip simulator system 170 activates an actuator of a seat of the vehicle 100 such that haptic feedback is delivered to the seat. The seat may be a seat in which the operator of the vehicle 100 sits. The haptic feedback is based upon the information about the environment of the vehicle 100 and a type of a virtual rumble strip. The rumble strip simulator system 170 may select the type of the virtual rumble strip when the virtual boundary is established or when the virtual boundary is crossed. As such, the type of the virtual rumble strip may be selected based upon the information about the environment. The rumble strip simulator system 170 may also activate the speaker 190 within the vehicle 100 such that audio feedback is delivered within the vehicle 100 by the speaker 190, wherein the audio feedback is based upon the information about the environment of the vehicle 100 and the type of the virtual rumble strip.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle 100 is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver)

provides inputs to the vehicle 100 to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the rumble strip simulator system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the rumble strip simulator system 170, and/or the autonomous driving module(s) 160 may control some or all of these vehicle systems 140 and, thus, may be partially or fully autonomous.

The processor(s) 110, the rumble strip simulator system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A computing system for generating a response of a vehicle to a virtual rumble strip, the computing system comprising:
    a processor; and
    memory communicably coupled to the processor that stores instructions that, when executed by the processor, cause the processor to:
        determine that the vehicle has crossed a virtual boundary corresponding to a real-world location in proximity to the vehicle based upon first sensor data generated by the vehicle;
        determine information about an environment of the vehicle as the vehicle crosses the virtual boundary based upon second sensor data generated by the vehicle;
        prior to determine that the vehicle has crossed the virtual boundary, determine the real-world location corresponding to the virtual boundary based upon third sensor data generated by the vehicle;
        establish the virtual boundary based upon the real-world location; and
        activate an actuator of a seat of an operator of the vehicle such that haptic feedback is delivered to the seat, wherein the haptic feedback is based upon the information about the environment of the vehicle, a speed of the vehicle, an orientation of the vehicle with respect to the virtual boundary, and a type of the virtual rumble strip, wherein an active damping system of the vehicle prevents a passenger seat of the vehicle from undergoing the haptic feedback.

2. The computing system of claim 1, wherein the type of the virtual rumble strip is one or more of:
    a centerline rumble strip;
    a shoulder rumble strip;
    a transverse rumble strip;
    a raised pavement marker; or
    Botts' dotts.

3. The computing system of claim 1, wherein the instructions further cause the processor to:
    prior to activate the actuator of the seat, select the type of the virtual rumble strip based upon the third sensor data.

4. A computing system for generating a response of a vehicle to a virtual rumble strip, the computing system comprising:
    a processor; and
    memory communicably coupled to the processor that stores instructions that, when executed by the processor, cause the processor to:
        determine that the vehicle has crossed a virtual boundary corresponding to a real-world location in proximity to the vehicle based upon first sensor data generated by the vehicle;
        determine information about an environment of the vehicle as the vehicle crosses the virtual boundary based upon second sensor data generated by the vehicle; and
        activate an actuator of a seat of an operator of the vehicle such that haptic feedback is delivered to the seat, wherein the haptic feedback is based upon the information about the environment of the vehicle, a speed of the vehicle, an orientation of the vehicle with respect to the virtual boundary, and a type of the virtual rumble strip, wherein an active damping system of the vehicle prevents a passenger seat of the vehicle from undergoing the haptic feedback.

5. A computing system for generating a response of a vehicle to a virtual rumble strip, the computing system comprising:
    a processor; and
    memory communicably coupled to the processor that stores instructions that, when executed by the processor, cause the processor to:
        determine that the vehicle has crossed a virtual boundary corresponding to a real-world location in proximity to the vehicle based upon first sensor data generated by the vehicle, wherein the instructions that cause the processor to determine that the vehicle has crossed the virtual boundary comprises instructions to:
            ascertain a location of the vehicle based upon data from at least one of a vehicle sensor of the vehicle or an environment sensor of the vehicle; and
            determine that the location of the vehicle overlaps at least in part with the real-world location corresponding to the virtual boundary;
        determine information about an environment of the vehicle as the vehicle crosses the virtual boundary based upon second sensor data generated by the vehicle; and
        activate an actuator of a seat of an operator of the vehicle such that haptic feedback is delivered to the seat, wherein the haptic feedback is based upon the information about the environment of the vehicle, a speed of the vehicle, an orientation of the vehicle with respect to the virtual boundary, and a type of the virtual rumble strip, wherein an active damping system of the vehicle prevents a passenger seat of the vehicle from undergoing the haptic feedback.

6. A computing system for generating a response of a vehicle to a virtual rumble strip, the computing system comprising:
- a processor; and
- memory communicably coupled to the processor that stores instructions that, when executed by the processor, cause the processor to:
  - determine that the vehicle has crossed a virtual boundary corresponding to a real-world location in proximity to the vehicle based upon first sensor data generated by the vehicle;
  - determine information about an environment of the vehicle as the vehicle crosses the virtual boundary based upon second sensor data generated by the vehicle; and
  - activate an actuator of a seat of an operator of the vehicle such that haptic feedback is delivered to the seat, wherein the haptic feedback is based upon the information about the environment of the vehicle, a speed of the vehicle, an orientation of the vehicle with respect to the virtual boundary, and a type of the virtual rumble strip, and wherein at least one of a frequency or an amplitude of the haptic feedback is based upon the information about the environment and the type of the virtual rumble strip, wherein an active damping system of the vehicle prevents a passenger seat of the vehicle from undergoing the haptic feedback.

7. The computing system of claim 6, wherein the information about the environment of the vehicle comprises at least one of:
- weather conditions around the vehicle;
- a time of day during which the vehicle is traveling;
- a day of the year during which the vehicle is traveling;
- a type of road on which the vehicle is traveling;
- a composition of the road on which the vehicle is traveling;
- an angle of the road on which the vehicle is traveling;
- an incline or a decline of the road on which the vehicle is traveling;
- a classification of an object in the environment;
- a classification of the environment;
- a number of tires of the vehicle making contact with a real-world area enclosed by the virtual boundary; or
- a surface area of a tire of the vehicle making contact with the real-world area.

8. A non-transitory computer-readable medium for generating a response of a vehicle to a virtual rumble strip and including instructions that, when executed by a processor, cause the processor to:
- determine that an object has crossed a virtual boundary corresponding to a real-world location in proximity of the vehicle as the vehicle travels based upon first sensor data generated by the vehicle;
- determine information about an environment of the vehicle as the object crosses the virtual boundary based upon second sensor data generated by the vehicle;
- activate an actuator of a seat of the vehicle such that haptic feedback is delivered to the seat, wherein the haptic feedback is based upon the information about the environment of the vehicle and a type of the virtual rumble strip, wherein an active damping system of the vehicle prevents a passenger seat of the vehicle from undergoing the haptic feedback; and
- determine that a physical rumble strip is absent from the real-world location corresponding to the virtual boundary, wherein the actuator is activated when the physical rumble strip is absent.

9. The non-transitory computer-readable medium of claim 8, wherein the object comprises:
- a second vehicle;
- a pedestrian;
- debris;
- a road sign; or
- a road marking.

10. A non-transitory computer-readable medium for generating a response of a vehicle to a virtual rumble strip and including instructions that, when executed by a processor, cause the processor to:
- determine that an object has crossed a virtual boundary corresponding to a real-world location in proximity of the vehicle as the vehicle travels based upon first sensor data generated by the vehicle;
- determine information about an environment of the vehicle as the object crosses the virtual boundary based upon second sensor data generated by the vehicle; and
- activate an actuator of a seat of the vehicle such that haptic feedback is delivered to the seat, wherein the haptic feedback is based upon the information about the environment of the vehicle and a type of the virtual rumble strip, wherein the virtual boundary encloses a virtual area corresponding to a real-world area in proximity of the vehicle, wherein the haptic feedback is delivered to the seat when at least one tire of the vehicle is located within the real-world area, and wherein an active damping system of the vehicle prevents a passenger seat of the vehicle from undergoing the haptic feedback.

11. A non-transitory computer-readable medium for generating a response of a vehicle to a virtual rumble strip and including instructions that, when executed by a processor, cause the processor to:
- determine that an object has crossed a virtual boundary corresponding to a real-world location in proximity of the vehicle as the vehicle travels based upon first sensor data generated by the vehicle;
- determine information about an environment of the vehicle as the object crosses the virtual boundary based upon second sensor data generated by the vehicle; and
- activate an actuator of a seat of the vehicle such that haptic feedback is delivered to the seat, wherein the haptic feedback is based upon the information about the environment of the vehicle and a type of the virtual rumble strip, wherein the virtual boundary is dynamically determined by the vehicle at different timesteps as the vehicle travels, wherein an active damping system of the vehicle prevents a passenger seat of the vehicle from undergoing the haptic feedback.

12. A method, comprising:
- determine that a virtual boundary corresponding to a real-world location in proximity of a vehicle has been crossed as the vehicle travels based upon first sensor data generated by the vehicle;
- determine information about an environment of the vehicle as the virtual boundary is crossed based upon second sensor data generated by the vehicle;
- activate an actuator of a seat of the vehicle such that haptic feedback is delivered to the seat, wherein the haptic feedback is based upon the information about the environment and a type of a virtual rumble strip, wherein the haptic feedback causes the seat to vibrate at a frequency and an amplitude that the seat vibrates at when at least one tire of the vehicle makes contact with a physical rumble strip of a same type as the virtual rumble strip; and prevent a passenger seat of the vehicle from undergoing the haptic feedback.

13. The method of claim 12, further comprising:

activate a speaker within the vehicle such that audio feedback is delivered within the vehicle by the speaker, wherein the audio feedback is based upon the information about the environment of the vehicle and the type of the virtual rumble strip.

14. The method of claim 12, wherein the virtual boundary is crossed by one of:

the vehicle; or an object in proximity of the vehicle.

15. A method, comprising:

determine that a virtual boundary corresponding to a real-world location in proximity of a vehicle has been crossed as the vehicle travels based upon first sensor data generated by the vehicle;

determine information about an environment of the vehicle as the virtual boundary is crossed based upon second sensor data generated by the vehicle;

activate an actuator of a seat of the vehicle such that haptic feedback is delivered to the seat, wherein the haptic feedback is based upon the information about the environment and a type of a virtual rumble strip;

prior to determine that the virtual boundary corresponding to the real-world location in proximity of the vehicle has been crossed, determine a location of a road marking in proximity of the vehicle based upon third sensor data;

define a virtual area based upon the third sensor data, wherein the virtual area corresponds to a real-world area that encloses the road marking;

establish the virtual boundary to enclose the virtual area; and prevent a passenger seat of the vehicle from undergoing the haptic feedback.

16. A method, comprising:

determine that a virtual boundary corresponding to a real-world location in proximity of a vehicle has been crossed as the vehicle travels based upon first sensor data generated by the vehicle;

determine information about an environment of the vehicle as the virtual boundary is crossed based upon second sensor data generated by the vehicle;

activate an actuator of a seat of the vehicle such that haptic feedback is delivered to the seat, wherein the haptic feedback is based upon the information about the environment and a type of a virtual rumble strip;

prior to determine that the virtual boundary corresponding to the real-world location in proximity of the vehicle has been crossed, determine a location of a road marking in proximity of the vehicle based upon third sensor data;

define a virtual area based upon the third sensor data, wherein the virtual area corresponds to a real-world area that is adjacent to the road marking;

establish the virtual boundary to enclose the virtual area; and prevent a passenger seat of the vehicle from undergoing the haptic feedback.

17. A method, comprising:

determine that a virtual boundary corresponding to a real-world location in proximity of a vehicle has been crossed as the vehicle travels based upon first sensor data generated by the vehicle;

determine information about an environment of the vehicle as the virtual boundary is crossed based upon second sensor data generated by the vehicle;

activate an actuator of a seat of the vehicle such that haptic feedback is delivered to the seat, wherein the haptic feedback is based upon the information about the environment and a type of a virtual rumble strip, wherein delivering the haptic feedback to the seat comprises vibrating the seat at a first frequency and a first amplitude when the vehicle travels at a first speed, wherein delivering the haptic feedback to the seat comprises vibrating the seat at a second frequency and a second amplitude when the vehicle travels at a second speed that is different than the first speed; and prevent a passenger seat of the vehicle from undergoing the haptic feedback.

* * * * *